April 1, 1952 M. CAMRAS 2,591,052

REEL

Original Filed July 17, 1944

Inventor

MARVIN CAMRAS by The Firm of Charles W. Hills Attys

Patented Apr. 1, 1952 2,591,052

UNITED STATES PATENT OFFICE 2,591,052

REEL

Marvin Camras, Chicago, Ill., assignor to Armour Research Foundation of Illinois Institute of Technology, Chicago, Ill., a corporation of Illinois Original application July 17, 1944, Serial No. 545,307, now Patent No. 2,515,190, dated July 18, 1950. Divided and this application February 1, 1946, Serial No. 644,818

4 Claims. (Cl. 242—118)

This invention relates to improvements in a reel, and more particularly to a reel designed for carrying an elongated element wound thereon and equipped with means to limit the rotation of the reel in either direction unless operating conditions are satisfactory for such rotation, the reel being highly desirable for carrying a recording medium and for use in connection with a magnetic recording and reproducing device, although the reel will have other uses and purposes as will be apparent to one skilled in the art.

This application is a division of my copending application entitled "Record Protector for Magnetic Recording and Reproducing Devices," filed July 17, 1944, Serial No. 545,307, now Patent No. 2,515,190, dated July 18, 1950.

While the instant invention will be herein described in connection with a magnetic recording and reproducing device by way of example and by way of illustrating its operation and use, it will be apparent that the reel may be used with substantially any device wherein under certain conditions of operation it may be desired to hold the reel against rotation, and wherein under certain other conditions of operation, rotation of the reel is desired. Illustrating the reel in its use with a magnetic recording and reproducing device provides a clear example of such operation.

In magnetic recording and reproducing devices, a substantially permanently magnetizable medium in the nature of a fine wire or tape is usually wound from one reel or spool to another reel or spool. Frequently the medium travels in the forward direction for both recording and reproduction, and travels in the reverse direction for rewinding purposes. It is customary in devices of this character which both record and reproduce to employ what may be termed an erasing head to demagnetize or otherwise clean the wire of a previous recording just prior to the placing of a new recording upon that medium. Upon the rewind and reproduction operations, the erasing head is automatically cut out of service. The reels or spools carrying the recording medium are removable and replaceable upon the device at will.

It has been proposed to place recordings upon such reels or spools, and then furnish the spools with the recorded medium thereon for use in homes and similar locations on reproducing devices. If the device is also capable of recording as well as reproducing, as most such devices are, it is desirable to prevent the accidental erasing or removing of some of the recording upon a spool. For example, if a customer purchases a spool having an opera recorded thereon, and intends to use that spool only for reproduction purposes when so desired, it is desirable to prevent any unintentional removal of a portion of the recording from the medium carried on that spool. Such unintentional removal of a portion of the recording could occur with a magnetic instrument capable of both recording and reproduction, in the event the instrument was set for recording unbeknownst to the operator, and with the erasing head in effective operation. Some of the valuable recording would then be lost before the operator realized that the machine was not set to reproduce.

Accordingly, it is an important object of the instant invention to provide a spool or reel for carrying an elongated element wound thereon and which also carries means for cooperation with means upon an unwinding device with which the spool or reel may be associated to prevent unintentional rotation of the reel.

Another object of this invention is the provision of a reel or spool for carrying an elongated element wound thereon and which also carries removable means arranged when the reel is in cooperation with an unwinding device to prevent rotation of the reel under certain conditions of operation, and if it is desired to eliminate such means they may be easily removed so that the reel is free to rotate under any and all conditions of operation.

It is a further object of the instant invention to provide a reel for carrying an elongated element wound thereon and which reel is equipped with means for cooperation with means upon an unwinding device to limit the rotative movement of the reel in either direction under certain conditions of operation, such limiting means being confined within the normal outlines of the reel.

A further object of this invention is the provision of a reel or spool for carrying an elongated element wound thereon, which reel is equipped with removable means to limit its rotation under certain conditions of operation, such means being economical to install on the reel, so as to add little material cost to the manufacture of the reel, and such means being removable by a user without the aid of tools.

Also a feature of this invention resides in the provision of a reel or spool for carrying an elongated element wound thereon, the reel having an annular recess in one side thereof, and means disposed in said recess for cooperation with means associated with an unwinding or rotating device to limit the movement of the reel in either direction under certain conditions of operation but permit rotation of the reel under other conditions of operation.

It is also an object of this invention to provide a spool or reel for carrying a recording medium, which spool or reel is especially constructed to cooperate with a recording and reproducing machine equipped with stopping mechanism for such a reel, which stop mechanism operates when the machine is set for a recording operation, so as to prevent rotation of the particular spool or reel.

Also a feature of the invention resides in the provision of a spool for a magnetic recording medium carrying means for cooperation with means on the magnetic recording and reproducing device, so that the spool will not be movable in the event the device is set for a recording operation, but which means may be easily adjusted or removed relatively to the spool to permit rotation of the spool for a recording operation if so desired.

While some of the more salient characteristics, features and advantages of the instant invention have been above pointed out, others will become apparent from the following disclosures, taken in conjunction with the accompanying drawing, in which.

As shown on the drawing.

Figure 1:
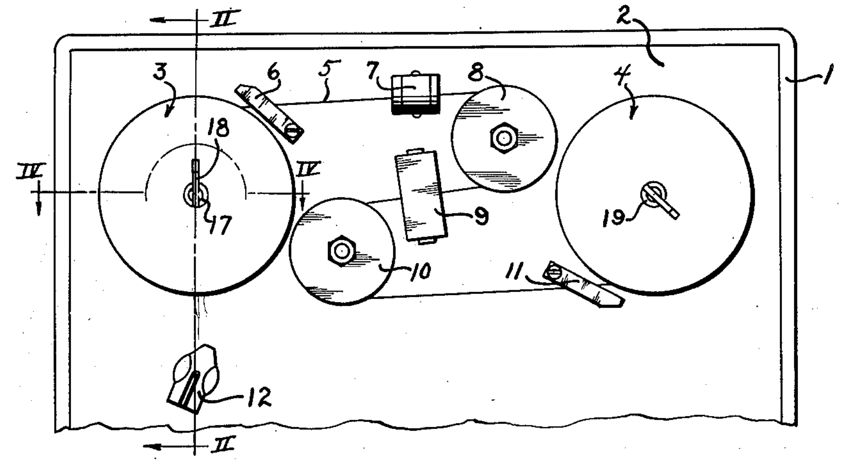
Figure 1 is a fragmentary front elevational view of a magnetic recording and reproducing device equipped with record carrying spools, embodying principles of the instant invention.

The illustrated embodiment of this invention is shown in conjunction with a magnetic recording and reproducing device including a cabinet or casing 1 having a front panel 2 upon which substantially all of the instrumentalities of interest in connection with the present invention are mounted. In an easily accessible location on the front of the panel 2 a pair of spaced reels or spools 3 and 4 may be removably mounted, and these spools carry a recording medium 5 which, in the illustrated instance, is shown in the form of a fine permanently magnetizable wire. The recording medium is partially wound about both of the spools and travels from one to the other depending upon the nature of the operation.

For example, the wire will travel from the spool 3 to the spool 4 for both recording and reproducing operations, and will travel in the reverse direction from the spool 4 to the spool 3 during a rewinding process.

During the travel of the wire in the forward direction, the wire first passes through a level winding instrumentality 6, then through an erasing head 7, around a guide pulley 8, through the field of a recording and reproducing head 9, thence over another guide pulley 10, through another level wind arrangement 11, and on to the reel 4. The recording medium follows the same path for both recording and reproducing operations, and the head 9 functions for both such operations. During a recording, the wire is magnetized longitudinally thereof by the head 9. During a reproducing operation, the head 9 functions as a pickup member for the impulses previously recorded upon the medium.

The erasing head 7 may be in the nature of a coil carrying a high frequency current which functions to demagnetize the recording medium prior to its reaching the recording head. The erasing head may be in several other forms, if so desired, it being only necessary that the wire pass through the field of the erasing head, and it is not necessary that the wire pass through the erasing head, as illustrated. The erasing head only operates during a recording operation. During a reproducing operation or a rewinding operation, the erasing head is automatically deenergized by any suitable means, not illustrated.

The device is set for either a recording or reproducing operation by means of a control member 12 which, in the illustrated instance, is shown as a dial. As viewed in Figure 1, the member 12 is moved to reproducing position. In order to set the device for a recording operation, the member 12 would be moved counter-clockwise from its position in Figure 1. This member may either have a neutral position, or be automatically rendered ineffective by some other suitable control for rewinding purposes.

With the recording and reproducing device as above described, a recording medium may be caused to travel in the forward direction, and have a recording placed thereon by the magnetization of the medium during its travel. Then it may be rewound from the spool 4 back upon the spool 3 in a rewinding operation. After that, the medium may be again moved forwardly and the previous recording reproduced from the medium.

Frequently, a spool will carry a medium having a record thereon that it is desired to preserve. Such may be a purchased record of an opera, a play, an oration, or some other production. Consequently, it is desirable to avoid any unintentional or accidental erasing of a portion of that recording. This could happen by placing the particular spool or spools upon the machine, and starting the medium traveling in the forward direction with the device set for a recording rather than a reproduction. With the device set for a recording, the erasing head 7 would be in effective operation, and a goodly portion of the recording might be removed or cleaned from the wire before the operator became aware that the device was not set for a reproducing operation. In other instances, it may be desired to repeatedly record, listen, and then again record upon the same wire or medium. In the latter event, it would be desirable to remove the first recording from the medium, and it would be intended that the erasing head function.

The present invention particularly seeks the accomplishment of either of these results, that is, permitting the erasure of a previous recording, and preventing the erasure of a recording of a type that would be preserved, without any particular adjustment of the machine or even a thought on the part of the operator. The invention also makes it possible to reuse a medium having a recording of the character normally preserved thereon, when it is desired to dispense with that preserved recording, and this requires only a very simple adjustment or removal of parts on the part of the operator.

In general, the reels or spools 3 and 4 are of the same construction, regardless of whether or not a recording is to be preserved against accidental erasure. As seen best in Figures 2 and 4, each spool includes a barrel portion 13 with integral side flanges 14 extending beyond the barrel. The inside portion of the barrel is hollowed to provide an annular cavity 15 around a central hub 16. Such cavity renders the spool lighter in weight. The spool 3 is mounted upon a shaft 17 projecting through the panel 2 to which it may be locked by any suitable form of lever mechanism such as is indicated at 18 in Figure 1. In similar manner, the spool 4 is removably connected to the protruding end of the shaft 19. Each of these shafts may function in turn as a driven shaft or an idler shaft depending upon the direction of movement of the recording medium. For example, if the medium moves in the forward direction, the shaft 19 will be connected to driving apparatus not illustrated, and thus the spool 3 will be a supply spool and the shaft 17 will idle. During a rewind operation, the shaft 17 will be connected to the driving apparatus, and the spool 4 in that event will be the supply spool and the shaft 19 will idle.

Where a medium is to be used repeatedly for different recordings, and the recordings erased successively as a new recording is put upon the same medium, the spool structure will be as above described. In that event where it is desired to preserve the recording against accidental erasure of a part of it, the spool is preferably provided with additional structure. In the illustrated instance, a spool for a recording to be preserved may be equipped with a series of projecting elements 20 in the nature of pins threadedly engaged with the spool barrel as indicated at 21 and extending axially of the spool inside the cavity 15. In the illustrated instance, there are four such pins shown, but it is obvious that any other suitable number may be used, one being sufficient in many cases.

In order to effect a stopping of a reel carrying the projecting members 20, a linkage is connected with the control member 12. As seen best in Figures 2 and 3, the shaft 22 of this member has a collar lever 23 secured to its inner end. The free end of the lever 23 is pivoted as at 24 to one end of a link 25. The opposite end of the link is freely pivoted as at 26 to the outer end of a lever 27 pivoted as at 28 to the panel 2 at an intermediate point. The opposite end of this lever 27 carries a stop pin 29 which extends into the cavity 15 of the reel, the panel 2 having an opening 30 therein to accommodate the pin 29.

Figures 2, 3, 4:
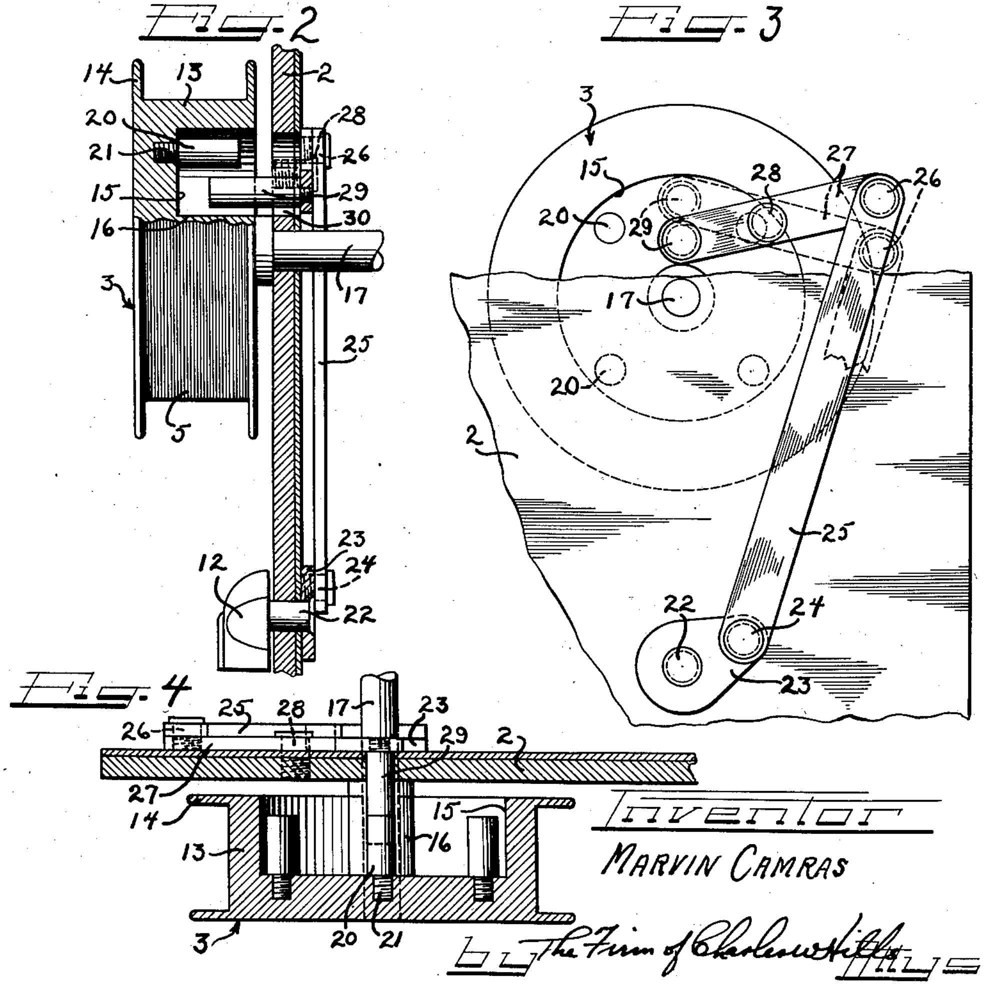
Figure 2 is an enlarged fragmentary vertical sectional view through the front panel of the device in Figure 1 taken substantially as indicated by the line II—II of Figure 1, looking in the direction of the arrows, and showing certain parts in elevation.
Figure 3 is a fragmentary rear elevational view, with parts broken way, of the structure seen in Figure 2.
Figure 4 is a fragmentary plan section view through the apparatus taken substantially as indicated by the line IV—IV of Figure 1.

When the control member 12 is in the position seen in Figure 1, which is the position for a reproducing operation, the reel 3 will be free to rotate on the shaft 17. The stop pin 29 will then be in the position seen in Figures 2 and 3, and the projecting members 20 carried by the reel are spaced radially outwardly beyond the stop pin, and so will never contact this pin. If the control member were inadvertently in the recording position, that is, counterclockwise from the position seen in Figure 1, the stop pin 29 would be elevated to the dotted line position of Figure 3 directly in the path of the projecting members 20 carried by the reel. One of these projecting members would abut the stop pin and prevent any further rotation of the particular reel. The relatively short movement of the reel before it was thus stopped would not be sufficient to cause a noticeable erasure of the recording on the medium carried by the reel. Thus it will be seen that the means above described effectively prevent the unintentional or accidental erasure of a recording of the type to be preserved.

In the event it is ever desired to remove a recording that up till then had been carefully preserved, and reuse the medium for another recording, it is a simple expedient to unscrew the projecting members 20 from a particular reel, place the reel upon the device, and operate the device for recording purposes, with the erasing head in effective operation. Without the projecting members 20 in the reel, the reel is free to turn on the shaft 17 and it makes no difference in what position of adjustment the stop pin 29 may be. It will then simply occupy some position within the cavity 15 of the reel and not interfere in any manner with the rotation of the reel.

From the foregoing, it is apparent that I have provided a simple and economical reel or spool structure embodying very simple means for effectively preventing the accidental or unintentional rotation of the reel under certain operating conditions. While the instant invention has been above explained specifically in connection with its use on a magnetic recording and reproducing device, other uses for such a reel or spool will at once be apparent to one skilled in the art. It will be noted that it is a simple expedient to make a simple adjustment upon the reel and thus adapt it for rotation in the event it is desired that the reel rotate freely under any and all conditions of operation. To accomplish that, it is simply necessary to remove the projections 20, an operation that may easily be done with the fingers of a user. It should also be especially noted that the reel, with or without the automatic stopping means, is of the same size and may be handled in the same manner as a reel never equipped with such stopping means. Consequently, the provision of the present invention does not add in any manner to the size of the reel, and the reel with the present invention thereon, may be used, packaged, and otherwise handled in identical fashion with a reel not provided with the instant invention.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A reel for carrying a recording medium and of a type adapted to be mounted on a magnetic recording and reproducing device and pay off the recording medium for reproduction purposes only, said reel having an annular hollow portion within the inner limits of the recording medium carrying portion thereof and having an inner wall extending substantially in the plane of rotation thereof, and a projecting stop extending from said inner wall into said hollow portion to hold the reel from rotation in a winding direction by selective abutment with a part of said device under certain conditions of operation, said projecting stop being removable when desired to permit rotation of said reel under all operating conditions.

2. A reel for carrying a recording medium and of a type adapted to be mounted on a magnetic recording and reproducing device and only pay off the recording medium for reproduction purposes, said reel having an annular cavity in its inner side within the limits of the recording medium carrying portion thereof and having an inner wall extending substantially in the plane of rotation thereof, and a series of studs threadedly engaged in said inner wall and extending into said cavity in position to be contacted by a part of said device and hold said reel from rotation when the device is set for a recording operation.

3. In a magnetic recording reel particularly adapted to pay off a recording medium for reproduction purposes only, a hub, a web extending therefrom along one side thereof, a rim extending from said web perpendicular to the plane thereof and having side flanges extending from opposite sides of said rim, an annular cavity between said hub and rim having an inner wall formed by the inner side of said web and opening to the side of said reel opposite from said web, and stopping means within said cavity to hold said reel from rotation except in a direction to pay off the recording medium therefrom for reproduction purposes, comprising a plurality of stops extending from said inner wall in spaced relation with respect to said hub and rim and in position to be engaged by a cooperating part of a recording and reproducing device, except when the device is set for reproducing operation.

4. A reel for carrying a recording medium arranged to be mounted for rotation on a magnetic recording and reproducing device, said reel comprising a hub having an internally recessed portion and having an outer surface for receiving a recording medium therearound, a removable abutment secured within said recessed portion arranged for engagement with means on said recording and reproducing device to prevent rotation of said reel in one direction, said abutment being removable to leave an unobstructed circumferential path of rotation for said reel in either direction.

MARVIN CAMRAS.

REFERENCES CITED

The following references are of record in the file of this patent:

UNITED STATES PATENTS

| Number | Name | Date |
|---|---|---|
| 729,095 | Rabbeth | May 26, 1903 |
| 947,148 | Browne | Jan. 18, 1910 |
| 1,245,755 | Mehlfelder | Nov. 6, 1917 |
| 1,515,960 | Mettras | Nov. 18, 1924 |
| 1,560,721 | O'Reilly | Nov. 10, 1925 |
| 1,567,119 | Dobyne | Dec. 29, 1925 |
| 1,882,718 | Arkema et al. | Oct. 18, 1932 |
| 2,168,675 | Lofgren et al. | Aug. 8, 1939 |
| 2,515,190 | Camras | July 18, 1950 |

FOREIGN PATENTS

| Number | Country | Date |
|---|---|---|
| 7,705 | Great Britain | Mar. 24, 1886 |